(12) United States Patent
Williams et al.

(10) Patent No.: US 12,197,819 B2
(45) Date of Patent: Jan. 14, 2025

(54) PROBABILISTIC DESIGN FOR METAMATERIALS REPRESENTED AS PROGRAM CODE

(71) Applicant: Siemens Industry Software Inc., Plano, TX (US)

(72) Inventors: Reed Williams, Princeton, NJ (US); Scott Kolb, Hopewell, NJ (US); Elena Arvanitis, Somerville, NJ (US); Pratik Thakkar, Harrison, NJ (US); Sudipta Pathak, Lawrence, NJ (US); Wesley Reinhart, Boalsburg, PA (US)

(73) Assignee: Siemens Industry Software Inc., Plano, TX (US)

( * ) Notice: Subject to any disclaimer, the term of this patent is extended or adjusted under 35 U.S.C. 154(b) by 33 days.

(21) Appl. No.: 17/904,239

(22) PCT Filed: Feb. 25, 2020

(86) PCT No.: PCT/US2020/019645
§ 371 (c)(1),
(2) Date: Aug. 15, 2022

(87) PCT Pub. No.: WO2021/173118
PCT Pub. Date: Sep. 2, 2021

(65) Prior Publication Data
US 2023/0147405 A1    May 11, 2023

(51) Int. Cl.
*G06F 3/048*    (2013.01)
*G06F 30/12*    (2020.01)
*G06F 113/10*   (2020.01)

(52) U.S. Cl.
CPC .......... *G06F 30/12* (2020.01); *G06F 2113/10* (2020.01)

(58) Field of Classification Search
CPC .............................. G06F 30/12; G06F 2113/10
See application file for complete search history.

(56) References Cited

U.S. PATENT DOCUMENTS

| 11,042,671 B1 * | 6/2021 | Sims ........................ G06F 30/12 |
| 2003/0058259 A1 * | 3/2003 | Kawaguchi ............. G06T 19/20 |
|  |  | 345/646 |

(Continued)

FOREIGN PATENT DOCUMENTS

WO    WO-2019182515 A1 *   9/2019   ............ B29C 64/124

OTHER PUBLICATIONS

Kosic et al., Application of 3D Printing in the metamaterials Designing, Sep. 2019, Researchgate, 19 pages.*

(Continued)

*Primary Examiner* — Linh K Pham

(57) ABSTRACT

A computing system may include a metamaterial representation engine configured to represent a metamaterial of a three-dimensional (3D) object as program code. The metamaterial may define an internal geometry of the 3D object and may be configured to be physically constructed via additive manufacturing. Representation of the metamaterial as program code may include assigning a value of a code parameter of the metamaterial as a probability distribution. The computing system may also include a metamaterial analysis engine configured to analyze the metamaterial through the probability distribution assigned for the value of the code parameter of the program code.

15 Claims, 5 Drawing Sheets

(56) References Cited

U.S. PATENT DOCUMENTS

| | | | | |
|---|---|---|---|---|
| 2012/0288627 | A1* | 11/2012 | Hodges, Jr. | H01Q 1/38 118/704 |
| 2014/0039847 | A1* | 2/2014 | Georgescu | G06F 30/15 703/1 |
| 2015/0148930 | A1* | 5/2015 | Kumar | G06T 19/20 700/98 |
| 2016/0096318 | A1* | 4/2016 | Bickel | B33Y 30/00 425/150 |
| 2016/0346997 | A1* | 12/2016 | Lewis | B33Y 80/00 |
| 2019/0179288 | A1* | 6/2019 | Wike | B29C 64/386 |
| 2019/0275744 | A1* | 9/2019 | Tsoutsos | B33Y 50/02 |
| 2020/0258598 | A1* | 8/2020 | Liu | G16C 60/00 |
| 2021/0350036 | A1* | 11/2021 | Burla | G06F 30/20 |
| 2022/0067240 | A1* | 3/2022 | Eom | G06F 30/13 |
| 2022/0327251 | A1* | 10/2022 | Lambert | G06F 30/17 |
| 2022/0350945 | A1* | 11/2022 | Guerguis | G06F 30/17 |
| 2023/0117766 | A1* | 4/2023 | Yang | G06F 30/12 700/98 |
| 2023/0177224 | A1* | 6/2023 | Weiss | G06F 30/23 703/1 |
| 2023/0281346 | A1* | 9/2023 | Aubin | G06F 30/10 703/1 |

OTHER PUBLICATIONS

Ion et al_2019; Metamaterial Devices, Apr. 2019, Hasso Platner Institute Digital Engineering department, University of Potsdam, 190 pages.*

Kosic et al_2019, 3D Analysis of Diferent Metamaterial Geometry and Simulation of Metamaterial Usage, 2019, © Faculty of Mechanical Engineering, Belgrade, 6 pages.*

P.E. Seiler et al: "The role of defects in dictating the strength of brittle honeycombs made by rapid prototyping", Acta Materialia, vol. 171, Jun. 1, 2019 (Jun. 1, 2019), pp. 190-200, 12 pages.

Liu Lu et al: Elastic and failure response of imperfect three-dimensional meta 11 i c lattices: the role of geometric defects induced by Selective Laser Melting11, Journal of the Mechanics and Physics of Solids, Pergamon Press, Oxford, GB, vol. 107, Jul. 6, 2017 (Jul. 6, 2017), pp. 160-184, 26 pages.

PCT Search Report dated Nov. 16, 2020, for PCT Application PCT/US2020/019645, 15 pages.

* cited by examiner

PROBABILISTIC DESIGN FOR METAMATERIALS REPRESENTED AS PROGRAM CODE

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

Figure 1:
FIG. 1 shows an example of a computing system that supports probabilistic design for metamaterials represented as program code.

As additive manufacturing (also referred to as 3D printing), topology optimization, and other 3D technologies become increasing viable, the design and manufacture of 3D parts with geometrically complex internal and external structures is becoming increasingly feasible. For instance, complex and optimized internal geometries of 3D parts may be designed as a metamaterial. As used herein, metamaterials may refer to an internal geometric composition of a 3D object, and in some examples metamaterials may be configured as a complex intermeshing of solid(s) and void regions. Metamaterials may include any engineered material or composite material designed with properties that do not naturally occur. In some instances, metamaterials may be wholly or partially enclosed by a layer of solid material or other object boundary. Metamaterials and other complex 3D geometries, when modeled geometrically through boundary-representations or other CAD-based explicit geometries (e.g., mesh faces or surface meshes), may require compositions of millions of geometric elements (or more) and include considerable geometric intricacy (e.g., high genus, highly curved, variable and irregular). Metamaterials may thus not be particularly well-suited for representation by standard CAD geometry paradigms, and may instead be well-suited for representation as program code via design-by-programming techniques.

Programmatic or design-by-programming representations of 3D geometries, including metamaterial geometries, may refer to any use of computer programming languages to represent object geometry, e.g., in contrast to explicit geometric CAD representations such as boundary-representations (B-Reps), surface meshes, and the like. Accordingly, metamaterial representations in program code may be implemented through use of computer programs through code variables and parameters, functions, data structures, loops, operators and other programming metaphors via programming languages such as Python, C++, C#, Java, any domain-specific languages (DSLs) or any other type of program code used to represent metamaterial or other 3D object geometries. As metamaterial properties and designs may include repeated structural elements with precise spacing and shapes (e.g., grids or lattices, repeated patterns, etc.), design-by-programming may provide an efficient and flexible mechanism to generate metamaterial designs for subsequent physical manufacture via 3D printing.

When metamaterials (and any other 3D geometries) are physically manufactured via additive manufacture, the as-manufactured dimensions of 3D parts may be different from the as-specified dimensions configured during a design phase of the 3D parts. Such inconsistencies are typically due to varying tolerances in machines and equipment used in the manufacturing process, such as a given fused-deposition modeling (FDM) printer, directed-energy deposition system, or other 3D printing device used to manufacture a 3D part, and the part's corresponding internal metamaterial geometry. Probabilistic engineering techniques can provide capabilities to represent dimensions and values as statistical distributions instead of static values and may thus support the propagation of potential part variations through 3D analysis pipelines. Probabilistic engineering, however, is typically limited in use to analyzing geometrically-incarnated 3D designs. That is, probabilistic design is limited to analysis of 3D designs in their generated state, e.g., as a 3D surface mesh or B-Rep, and thus at a point in which redesigns based on probabilistic analyses can be costly, time-consuming, and inefficient.

The disclosure herein may provide systems, methods, devices, and logic for probabilistic design for metamaterials represented as program code. As described in greater detail herein, a combination of design-by-programming representations of metamaterials that include code parameters specified as probability distributions (e.g., instead of static values) may support the design of new, robust metamaterials which can exhibit properties as-designed, even post-manufacture despite manufacturing variances of 3D printers. By introducing probabilistic capabilities into program code itself, the probabilistic metamaterial features described herein may improve the efficiency and accuracy of programmatic representations of metamaterials, and the features described herein may provide a framework that increases the flexibility, power, and efficiency for designing unique, complex, and functional materials and structures via program code. As probabilistic representations of metamaterial properties may be specified during design (e.g., via program code during design of metamaterials), the features described herein may improve the efficiency of design processes by reducing costly redesigns and/or providing additional analysis capabilities concurrent with 3D object design via program code.

These and other probabilistic metamaterial features and technical benefits are described in greater detail herein.

FIG. 1 shows an example of a computing system 100 that supports probabilistic design for metamaterials represented as program code. The computing system 100 may take the form of a single or multiple computing devices such as application servers, compute nodes, desktop or laptop computers, smart phones or other mobile devices, tablet devices, embedded controllers, and more.

As an example implementation to support any combination of the probabilistic metamaterial features described herein, the computing system 100 shown in FIG. 1 includes a metamaterial representation engine 110 and a metamaterial analysis engine 112. The computing system 100 may implement the engines 110 and 112 (including components thereof) in various ways, for example as hardware and programming. The programming for the engines 110 and 112 may take the form of processor-executable instructions stored on a non-transitory machine-readable storage medium and the hardware for the engines 110 and 112 may include a processor to execute those instructions. A processor may take the form of single processor or multi-processor systems, and in some examples, the computing system 100 implements multiple engines using the same computing system features or hardware components (e.g., a common processor or a common storage medium).

In operation, the metamaterial representation engine 110 may represent a metamaterial as program code, and the metamaterial may define an internal geometry of a 3D object and be configured to be physically constructed via additive manufacturing. In representing the metamaterial as program code, the metamaterial representation engine 110 may assign a value of a code parameter of the metamaterial as a probability distribution. In operation, the metamaterial analysis engine 112 may analyze the metamaterial through the probability distribution assigned for the value of the code parameter of the program code.

These and other probabilistic metamaterial features are described in greater detail next. Many of the examples described herein are presented with reference to metamaterials represented as program code. However, any of the probabilistic metamaterial features described herein may likewise be consistently applicable and implemented for programmatic/code-based representations of any 3D object geometry, e.g., of surface geometries, microstructures, repeated surface patterns, composite 3D objects, and more.

Figure 2:
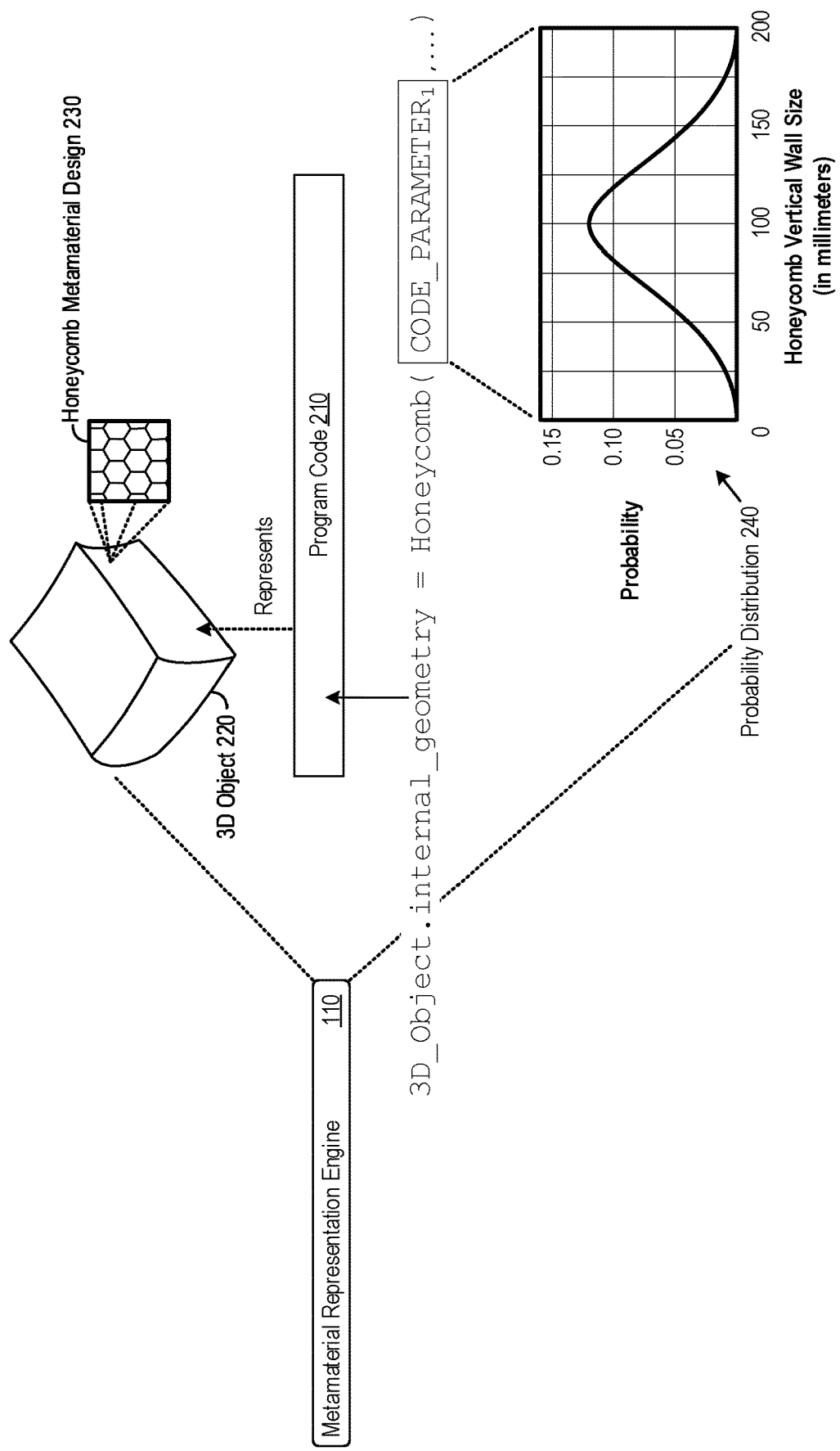
FIG. 2 shows an example of program code for a three-dimensional (3D) object that includes code parameters with values assigned as probability distributions.

FIG. 2 shows an example of program code for a 3D object that includes code parameters with values assigned as probability distributions. The example shown in FIG. 2 is described with reference to the metamaterial representation engine 110, which may implement and provide any number of probabilistic metamaterial design capabilities as described herein.

In particular, the metamaterial representation engine 110 may represent a 3D object, metamaterial that defines an internal (or other) geometry of the 3D object, or both as program code, e.g., in Python, Java, C#, or as code in any other computer programming language. In FIG. 2, the metamaterial representation engine 110 represents a 3D object via the program code 210, which may comprise multiple lines of code that programmatically represent a 3D object and corresponding metamaterial(s). The program code 210 in FIG. 2 represents a 3D object 220 that includes an internal geometry formed via a honeycomb metamaterial design 230. The honeycomb metamaterial design 230 may include repeated instances of honeycomb shapes that collectively form an internal structure of the 3D object 220. The repeated instances may be uniform or non-uniform (e.g., increasing by 5% for each instance progressively across a coordinate space).

The metamaterial representation engine 110 may support various forms of the program code 210 that represent the 3D object 220 and honeycomb metamaterial design 230 (or any additional or alternative metamaterials). Depending on such forms, properties of the honeycomb metamaterial design 230 may be designed, configured, and represented in various ways. As used herein, a code parameter for a metamaterial may refer to any variable (whether global or local), parameter, function input, or other value of program code that represents or affects a property of the metamaterial. Code parameters may thus be set in program code to control metamaterial properties, and code parameters may specify a vertex position within the metamaterial, a metamaterial shape parameter, a material thickness of the metamaterial (or portions thereof), metamaterial thicknesses or spacing of metamaterial pattern instances, metamaterial boundaries, a range of metamaterial void regions, or any other property of the metamaterial.

As an illustrative example for program code-based metamaterial representations and corresponding code parameters, the program code 210 of FIG. 2 may include a Honeycomb ( ) function programmed, for example, in Python that inserts a metamaterial into a 3D object in a repeated honeycomb pattern based on specified code parameters provided as inputs into the Honeycomb ( ) function or otherwise accessed. The Honeycomb ( ) function may take, as an example function input, a first argument that defines the vertical wall size of the honeycomb metamaterial design 230, shown as $CODE\_PARAMETER_1$ in FIG. 2. The metamaterial representation engine 110 may specify a value for code parameters of the program code 210, including $CODE\_PARAMETER_1$, as probability distributions. Put another way, instead of setting the value of $CODE\_PARAMETER_1$ as a static value (e.g., $CODE\_PARAMETER_1=100$;), the metamaterial representation engine 110 may assign the value of $CODE\_PARAMETER_1$ as a probability distribution, such as the probability distribution 240 shown in FIG. 2.

To assign code parameter values as probability distributions, the metamaterial representation engine 110 may utilize probability distribution functions. A probability distribution function may provide a function-based spectrum of values for a code parameter based on an as-designed value, e.g., 100 micrometers for the honeycomb vertical wall size of the honeycomb metamaterial design 230. Thus, for a particular as-designed value that may be set, configured, or desired for a metamaterial property of a 3D object, the metamaterial representation engine 110 may represent the as-designed value as a probability distribution function reflective of as-manufactured conditions, variances, and tolerances for the as-designed value instead of as a static value for the as-designed value. Various forms and implementations of probability distribution functions by the metamaterial representation engine 110 are contemplated herein.

In some implementations, the metamaterial representation engine 110 assigns the value of a code parameter as a probabilistic function by setting the code parameter as a random variable defined through a probability distribution function. For $CODE\_PARAMETER_1$ as shown in FIG. 2, the metamaterial representation engine 110 may set the first argument of the Honeycomb ( ) function as a random variable defined through a probability distribution function that sets the value of $CODE\_PARAMETER_1$ as the distribution curve, values, and probabilities of the probability distribution 240, which may thus account for variations in manufacture that impact the as-manufactured value of the vertical wall heights for the honeycomb metamaterial design 230 of the 3D object 220.

The probability distribution 240 for $CODE\_PARAMETER_1$ of the program code 210 may account for manufacturing variations for a particular 3D printer to be used to physically construct the 3D object 220, including variations applicable to physical manufacture of the honeycomb metamaterial design 230. To determine the appropriate probability distribution to set for a given metamaterial property with an as-designed value, the metamaterial representation engine 110 may access sampling data for the particular 3D printer to be used to physically construct the 3D object 220. Such sampling data that identifies manufacturing variations or tolerances for a given 3D printer may be determined, accessed, or generated by sampling test parts printed by the given 3D printer and evaluating variations on the test parts. That is, a particular probability distribution assigned by the metamaterial representation engine 110 to represent metamaterial properties may account for tolerances and variations of a specific 3D printer or manufacturing process, thus providing distributions that correlate to as-manufactured physical parts that may result from as-designed 3D objects (e.g., via the program code 210).

By representing code parameters of the program code as probability distributions instead of static values, the metamaterial representation engine 110 may support probabilistic metamaterial design in 3D objects and metamaterials designed through design-by-programming. Defining values of code parameters in a design-by-programming environment as probability distributions rather than static values may provide a probabilistic paradigm during a design phase, instead of having to wait until after completion of 3D object designs via other CAD-based design flows. As such, the metamaterial representation engine 110 may assign values for code parameters of metamaterials as probability distributions independent of (e.g., prior to) any incarnation of the metamaterial or the 3D object 220 into a 3D boundary representation or other CAD-based geometric representation. Moreover, the probabilistic metamaterial design features described herein may support analysis processes that operate directly on program code of a metamaterial design to incorporate and account for manufacturing variances and tolerances.

Figure 3:
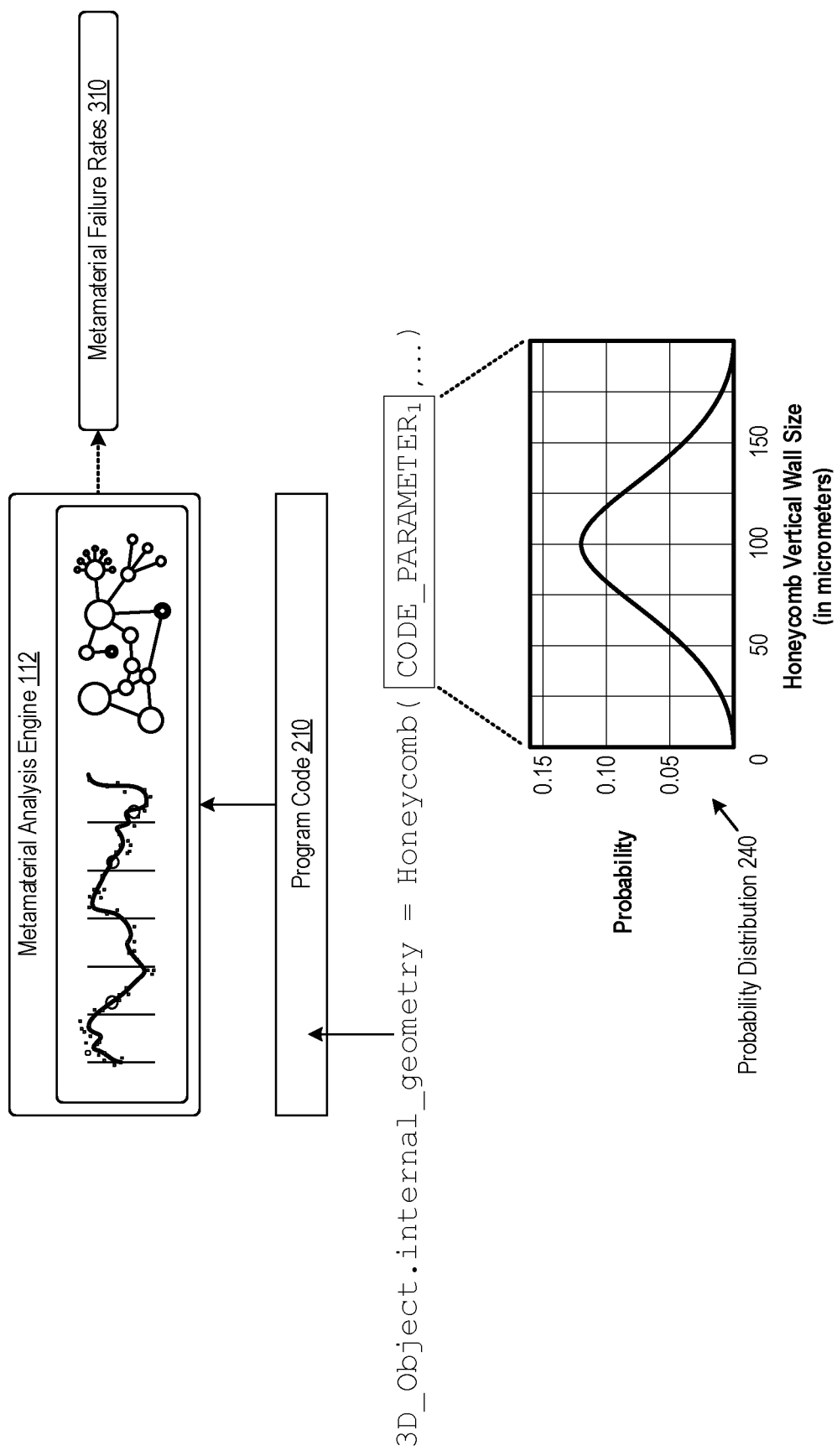
FIG. 3 shows an example analysis for program code of a 3D object that includes code parameters with values assigned as probability distributions.

FIG. 3 shows an example analysis for program code of a 3D object that includes code parameters with values assigned as probability distributions. The example shown in FIG. 2 is described with reference to the metamaterial analysis engine 112, which may implement and provide any number of probabilistic metamaterial analysis capabilities.

In the example shown in FIG. 3, the metamaterial analysis engine 112 analyzes the program code 210 as described in FIG. 2, which may include a honeycomb metamaterial design 230 represented as program code including code parameters represented as probability distributions. Note that the metamaterial analysis engine 112 may directly analyze source code, e.g., the program code 210, and need not wait for design of 3D objects to be incarnated as B-Reps, surface meshes, or other CAD-based geometric representations during a post-design process. In that regard, the metamaterial analysis engine 112 may support probabilistic analyses of 3D objects concurrent with, in parallel to, or as component of a 3D object design phase in which the program code 210 is developed.

The metamaterial analysis engine 112 may analyze the program code 210 through the probability distributions configured, set, assigned, or otherwise represented via the program code 210 (e.g., as random variables and/or probability distribution functions that account for manufacturing variances and tolerances of 3D printing processes or devices). In some implementations, the metamaterial analysis engine 112 may sample some or all of the probability distributions of the program code 210, and generate a set of virtual 3D objects that represent digital versions of as-manufactured 3D objects. Through the representative set, the metamaterial analysis engine 112 may determine a failure rate, e.g., a percentage of virtual "as-manufactured" 3D objects with metamaterial properties that fail a quality test or other evaluation metric. As part of an analysis process for the program code 210, the metamaterial analysis engine 112 may sample the probability distribution 240 for different values of $CODE\_PARAMETER_1$ of the honeycomb metamaterial design 230 to determine failure rates of the metamaterial based on the different values sampled for $CODE\_PARAMETER_1$ specifying the vertical wall height of the honeycomb metamaterial design 230.

In FIG. 3, the metamaterial analysis engine 112 generates, as an analysis output, data for metamaterial failure rates 310 computed based on the probability distributions of the programmatic representation of a 3D object. Any number of additional or alternative analysis outputs are contemplated herein, such as as-manufactured 3D part capability reports, distribution reports, success rates (e.g., as measured according to any number or part evaluation metrics), and more.

As another analysis example, the metamaterial analysis engine 112 may provide intelligent analysis capabilities such that brute force sampling of probability distributions in the program code 210 need not be performed exhaustively. In some implementations, the metamaterial analysis engine 112 may analyze the program code 210 by analyzing a worst-case or threshold-case scenario for the probability distributions of the program code 210, and evaluating the probability distributions according to a worst-case metamaterial property (e.g., a code parameter value on the probability distribution with the lowest probability) or a threshold-case scenario (e.g., a code parameter on the probability distribution that exactly satisfies an evaluation criteria for the metamaterial, such as a minimum allowable metamaterial thickness, maximum tolerable spacing, or other configurable criteria). In such cases, the metamaterial analysis engine 112 may analyze such corner, worst-case, or threshold-based cases along the probability distributions to determine worst-case scenarios or failure probabilities based on probabilities of threshold-based values being present in as-manufactured 3D parts constructed during physical manufacture.

As yet another analysis example, the metamaterial analysis engine 112 may apply probability distribution multiplication techniques to propagate the effect of distributions across inter-related metamaterial components and/or properties. For closed form or partial-closed form solutions, the metamaterial analysis engine 112 may multiply given probability distributions assigned to selected code parameters values in order to generate product probability distributions, which may reflect a probability distribution for the inter-related metamaterial components or properties. Such product probability distributions may provide probabilities for failure rates of physical metamaterial manufacture, e.g., probability that manufacture of the inter-related metamaterial components by a given 3D printer will have properties that fall below a threshold evaluation metric.

In any of the ways described herein, the metamaterial analysis engine 112 may support manufacturing analyses directly through source code or other programmatic representations of 3D objects or metamaterials, including code parameters with values assigned as probability distributions. While some probabilistic metamaterial analysis capabilities are described herein, the metamaterial analysis engine 112 may provide any number of additional or alternative analysis capabilities via probability distributions represented in program code of metamaterial designs.

Figure 4:
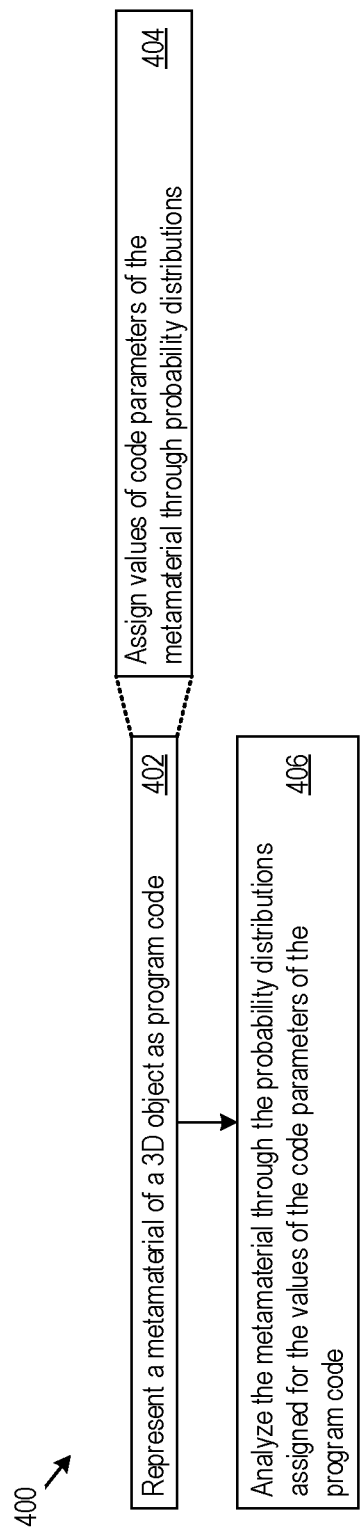
FIG. 4 shows an example of logic that a system may implement to support probabilistic design for metamaterial representations in program code.

FIG. 4 shows an example of logic 400 that a system may implement to support probabilistic design for metamaterials represented as program code. For example, the computing system 100 may implement the logic 400 as hardware, executable instructions stored on a machine-readable medium, or as a combination of both. The computing system 100 may implement the logic 400 via the metamaterial representation engine 110 and the metamaterial analysis engine 112, through which the computing system 100 may perform or execute the logic 400 as a method to support probabilistic design for metamaterials represented as program code. The following description of the logic 400 is provided using the metamaterial representation engine 110 and the metamaterial analysis engine 112 as examples. However, various other implementation options by systems are possible.

In implementing the logic 400, the metamaterial representation engine 110 may represent a metamaterial of a 3D object as program code (402), and the metamaterial may define an internal geometry of the 3D object and the metamaterial may be configured to be physically constructed via additive manufacturing. In representing the metamaterial as program code, the metamaterial representation engine 110 may assigns values of code parameters of the metamaterial as probability distributions (404). In implementing the logic 400, the metamaterial analysis engine 112 may analyze the metamaterial through the probability distributions assigned for the values of the code parameters of the program code (406).

The logic 400 shown in FIG. 4 provides an illustrative example by which a computing system 100 may support probabilistic design for metamaterials represented as program code. Additional or alternative steps in the logic 400 are contemplated herein, including according to any features described herein for the metamaterial representation engine 110, metamaterial analysis engine 112, or any combinations thereof.

Figure 5:
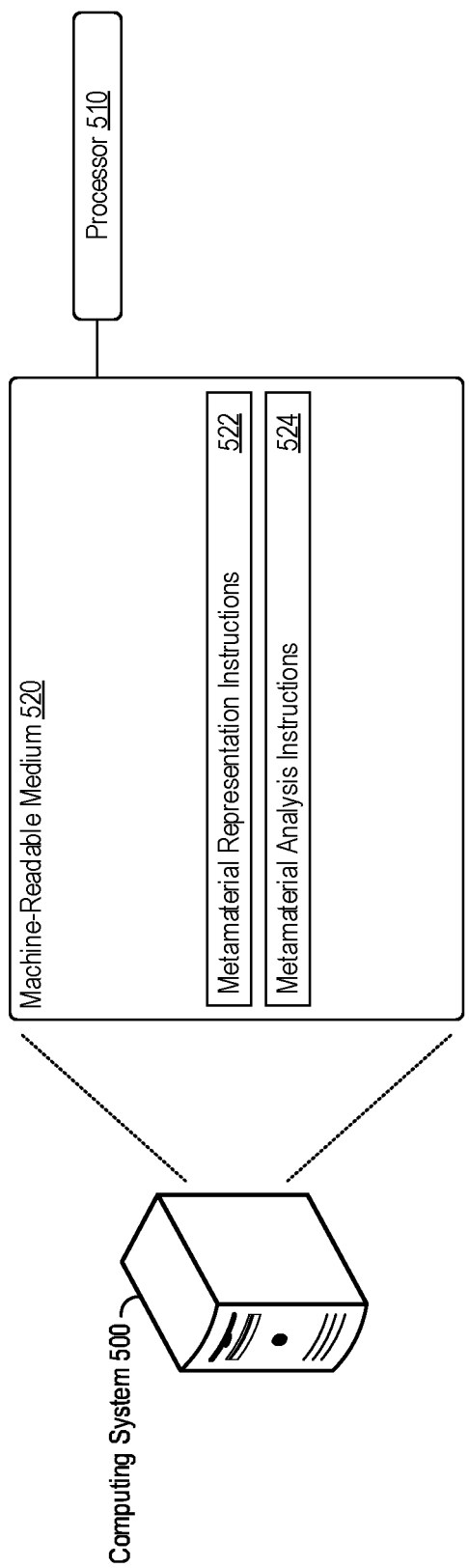
FIG. 5 shows an example of a computing system that supports probabilistic design for metamaterials represented as program code.

FIG. 5 shows an example of a computing system 500 that supports probabilistic design for metamaterials represented as program code. The computing system 500 may include a processor 510, which may take the form of a single or multiple processors. The processor(s) 510 may include a central processing unit (CPU), microprocessor, or any hardware device suitable for executing instructions stored on a machine-readable medium. The system 500 may include a machine-readable medium 520. The machine-readable medium 520 may take the form of any non-transitory electronic, magnetic, optical, or other physical storage device that stores executable instructions, such as the metamaterial representation instructions 522 and the metamaterial analysis instructions 524 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor 510. Executing the instructions (e.g., the metamaterial representation instructions 522 and/or the metamaterial analysis instructions 524) may cause the computing system 500 to perform any of the probabilistic metamaterial features described herein, including according to any of the features with respect to the metamaterial representation engine 110, the metamaterial analysis engine 112, or a combination of both.

For example, execution of the metamaterial representation instructions 522 by the processor 510 may cause the computing system 500 to represent a metamaterial of a 3D object as program code, including by representing the metamaterial as program code comprises assigning a value of a code parameter of the metamaterial as a probability distribution. The metamaterial may define an internal geometry of the 3D object, and the metamaterial may be configured to be physically constructed via additive manufacturing. Execution of the metamaterial analysis instructions 524 by the processor 510 may cause the computing system 500 to analyze the metamaterial through the probability distribution assigned for the value of the code parameter of the program code.

Any additional or alternative probabilistic metamaterial features as described herein may be implemented via the metamaterial representation instructions 522, metamaterial analysis instructions 524, or a combination of both.

The systems, methods, devices, and logic described above, including the metamaterial representation engine 110 and the metamaterial analysis engine 112, may be implemented in many different ways in many different combinations of hardware, logic, circuitry, and executable instructions stored on a machine-readable medium. For example, the metamaterial representation engine 110, the metamaterial analysis engine 112, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the metamaterial representation engine 110, the metamaterial analysis engine 112, or combinations thereof.

The processing capability of the systems, devices, and engines described herein, including the metamaterial representation engine 110 and the metamaterial analysis engine 112, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   by a computing system:
   representing a metamaterial of a three-dimensional (3D) object as program code,
   wherein the metamaterial defines an internal geometry of the 3D object,
   wherein the metamaterial is configured to be physically constructed via additive manufacturing, and wherein representing the metamaterial as program code comprises assigning a value of a code parameter of the metamaterial as a probability distribution, wherein the probability distribution represents manufacturing variations for the value for a particular 3D printer to be used to physically construct the metamaterial; and analyzing the metamaterial through the probability distribution assigned for the value of the code parameter of the program code, including by sampling the probability distribution for different values of the code parameter to determine failure rates of the metamaterial based on the different values.

2. The method of claim 1, wherein the manufacturing variations for the particular 3D printer are determined by sampling test parts printed by the 3D printer and evaluating variations on the test parts.

3. The method of claim 1, wherein assigning the value of the code parameter as the probability distribution comprises setting the code parameter as a random variable defined through a probability distribution function.

4. The method of claim 1, comprising assigning the code parameter of the metamaterial prior to any incarnation of the metamaterial or the 3D object into a 3D boundary representation.

5. The method of claim 1, wherein the code parameter specifies a vertex position within the metamaterial, a metamaterial shape parameter, or a material thickness of the metamaterial.

6. A system comprising:
a processor; and
a non-transitory machine-readable medium comprising instructions that when executed by the processor, cause a computing system to represent a metamaterial of a three-dimensional (3D) object as program code,
wherein the metamaterial defines an internal geometry of the 3D object,
wherein the metamaterial is configured to be physically constructed via additive manufacturing, and
wherein representation of the metamaterial as program code comprises assigning a value of a code parameter of the metamaterial as a probability distribution, wherein the probability distribution represents manufacturing variations for the value for a particular 3D printer to be used to physically construct the metamaterial; and
analyze the metamaterial through the probability distribution assigned for the value of the code parameter of the program code, including by sampling the probability distribution for different values of the code parameter to determine failure rates of the metamaterial based on the different values.

7. The system of claim 6, wherein the manufacturing variations for the particular 3D printer are determined by sampling test parts printed by the 3D printer and evaluating variations on the test parts.

8. The system of claim 6, wherein the instructions, when executed, cause the computing system to assign the value of the code parameter as the probability distribution by setting the code parameter as a random variable defined through a probability distribution function.

9. The system of claim 6, wherein the instructions, when executed, cause the computing system to assign the code parameter of the metamaterial prior to any incarnation of the metamaterial or the 3D object into a 3D boundary representation.

10. The system of claim 6, wherein the code parameter specifies a vertex position within the metamaterial, a metamaterial shape parameter, or a material thickness of the metamaterial.

11. A non-transitory machine-readable medium comprising instructions that, when executed by a processor, cause a computing system to:
represent a metamaterial of a three-dimensional (3D) object as program code,
wherein the metamaterial defines an internal geometry of the 3D object,
wherein the metamaterial is configured to be physically constructed via additive manufacturing, and
wherein representing the metamaterial as program code comprises assigning a value of a code parameter of the metamaterial as a probability distribution, wherein the probability distribution represents manufacturing variations for the value for a particular 3D printer to be used to physically construct the metamaterial; and
analyze the metamaterial through the probability distribution assigned for the value of the code parameter of the program code, including by sampling the probability distribution for different values of the code parameter to determine failure rates of the metamaterial based on the different values.

12. The non-transitory machine-readable medium of claim 11, wherein the manufacturing variations for the particular 3D printer are determined by sampling test parts printed by the 3D printer and evaluating variations on the test parts.

13. The non-transitory machine-readable medium of claim 11, wherein the instructions cause the computing system to assign the value of the code parameter as the probability distribution by setting the code parameter as a random variable defined through a probability distribution function.

14. The non-transitory machine-readable medium of claim 11, wherein the instructions cause the computing system to assign the code parameter of the metamaterial prior to any incarnation of the metamaterial or the 3D object into a 3D boundary representation.

15. The non-transitory machine-readable medium of claim 11, wherein the code parameter specifies a vertex position within the metamaterial, a metamaterial shape parameter, or a material thickness of the metamaterial.

* * * * *